US006042096A

United States Patent [19]

MacLean

[11] Patent Number: 6,042,096

[45] **Date of Patent: *Mar. 28, 2000**

[54] WORKPIECE LOCATING DEVICE

[75] Inventor: John MacLean, Calgary, Canada

[73] Assignee: Pacific Automation Ltd., Calgary, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,728

[22] Filed: Mar. 24, 1997

[51] Int. Cl.[7] ........ B23Q 3/00

[52] U.S. Cl. ........ 269/37; 269/99; 269/303; 269/305; 269/315; 269/910

[58] Field of Search ........ 248/223.41, 231.9, 248/246, 188.4, 220.1, 231.21; 269/99, 100, 91–94, 303, 305, 315, 910; 294/93, 96, 103.1, 86.24; 403/297, 295; 29/266

[56] References Cited

U.S. PATENT DOCUMENTS

| | | | |
|---|---|---|---|
| 780,959 | 1/1905 | Palmer | 248/231.91 |
| 2,560,525 | 7/1951 | Nyl | 269/100 |
| 2,604,352 | 7/1952 | Gonser | 294/93 |
| 3,188,715 | 6/1965 | Michalsen . | |
| 3,554,530 | 1/1971 | Moore . | |
| 4,057,889 | 11/1977 | Ferguson | 29/266 |
| 4,186,916 | 2/1980 | Varga | 269/303 |
| 4,284,267 | 8/1981 | Marben . | |
| 4,530,493 | 7/1985 | Break . | |
| 4,557,371 | 12/1985 | Yonezawa . | |
| 4,872,629 | 10/1989 | Cothran et al. | 248/231.91 |
| 5,342,030 | 8/1994 | Taylor | 269/910 |
| 5,516,089 | 5/1996 | Seniff et al. . | |
| 5,608,970 | 3/1997 | Owen | 269/303 |
| 5,732,937 | 3/1998 | Morghen | 269/305 |

FOREIGN PATENT DOCUMENTS

| | | |
|---|---|---|
| 100731 | 8/1906 | Canada . |

*Primary Examiner*—Robert C. Watson
*Attorney, Agent, or Firm*—McAulay Nissen Goldberg Kiel & Hand, LLP

[57] ABSTRACT

There is provided a new and useful workpiece locating device for use on a machine table comprising at least two spaced elongated support members arranged in parallel so as to create at least one elongated slot, in a top surface of said table, between adjacent support members in which the locating device comprises a first member for insertion into the slot, which first member comprises a base having a width less the width of the slot and at least one locking means to releasably secure the base within the slot and a second member fastened to the first member in which the second member is upstanding relative to the top surface of the table when the device is positioned in the slot.

22 Claims, 3 Drawing Sheets

WORKPIECE LOCATING DEVICE

FIELD OF THE INVENTION

This invention relates to a workpiece locating device for use on a machine table having at least one elongated slot.

BACKGROUND OF THE INVENTION

Truss manufacturing plants rely on specially designed tables and moveable locating devices or stop pieces in order to properly design and build both wooden and metal trusses. Typically, such tables are made up of a series of elongated planks or bars, running in parallel spaced relation to one another. Those bars are normally wider at the top then at the bottom so that the slots which are formed in between adjacent bars have a wider bottom portion than top portion. The configuration of the slots is basically in the form of an "inverted-T shape".

The locating devices or stop pieces are consequently designed to match the inverted-T shape of the slot. That is, they are designed to be held in place vertically by abutting against the flanges in the slot which result from the narrowing of the slot at its top portion. Those stop pieces then are provided with a means of abutting against the workpiece to hold it in place on the table.

One of the disadvantages to this conventional configuration for both the slot and the stop pieces is that in order to remove the stop piece, it must be slid longitudinally along the length of the slot and removed from either end of the slot. The typical stop piece cannot be removed vertically and similarly cannot be dropped into place where desired. Thus, the usefulness of such stop pieces or locating devices is restricted. When such devices are required to be positioned within a partially or fully assembled truss, they cannot be subsequently removed without removing at least one of the abutting truss members from the table.

In addition, the typical stop pieces in order to be held in place vertically within the slot when in use require the inverted-T configuration of the slot. Those devices are not contemplated to be used in a table having straight sided slots.

PRIOR ART

Reference may be had to U.S. Pat. No. 4,530,493 of Break, issued Jul. 23, 1985 which describes a fastener assembly for use on a machine tool having a work supporting surface and at least one elongated inverted T-slot formed in the table, and U.S. Pat. No. 3,188,715 of R. H. Michalsen, issued Jun. 15, 1965, and which describes a table assembly and locator means in combination to position a workpiece on the table. The top portion of the locator means has flanges which cooperate with the channel to prevent it from passing directly into the channel. Reference may similarly be had to U.S. Pat. No. 4,186,916 of Varga, issued Feb. 5, 1980, which describes a positioning means for machine tools which is essentially of a two piece construction. The top block can be vertically placed in the mouth of a T-slot and cooperates with the bottom T-shape block which is slid into place.

SUMMARY OF THE INVENTION

It is thus an object of the present invention to provide an improved workpiece locating device for use on a machine table having at least one elongated slot.

In one aspect of the invention, there is provided a workpiece locating device for use on a machine table comprising at least two spaced elongated support members arranged in parallel so as to create at least one elongated slot, in a top surface of said table, between adjacent support members. The locating device comprises a first member for insertion into the slot, comprising a base having a width less the width of the slot, and at least one locking means to releasably secure the base within the slot; and a second member fastened to the first member. The second member is upstanding relative to the top surface of the table when the device is positioned in the slot.

In another aspect of the invention, the second member has a width greater than the width of the slot.

In another aspect of the invention, there is a bottom surface in the slot.

In a preferred embodiment of the invention, the base comprises at least one recessed lateral surface spaced from one side of the slot when the base is in position in the slot.

In a further preferred embodiment of the invention, the locking means is an adjustable threaded fastener extending from a recessed surface of the base and moveable between a first position in which the base is freely moveable relative to the slot and a second position in which the base is frictionally engaged against movement relative to the slot.

BRIEF DESCRIPTION OF THE DRAWINGS

These and other advantages of the invention will become apparent upon reading the following detailed description and upon referring to the drawings in which.

Figure 1:
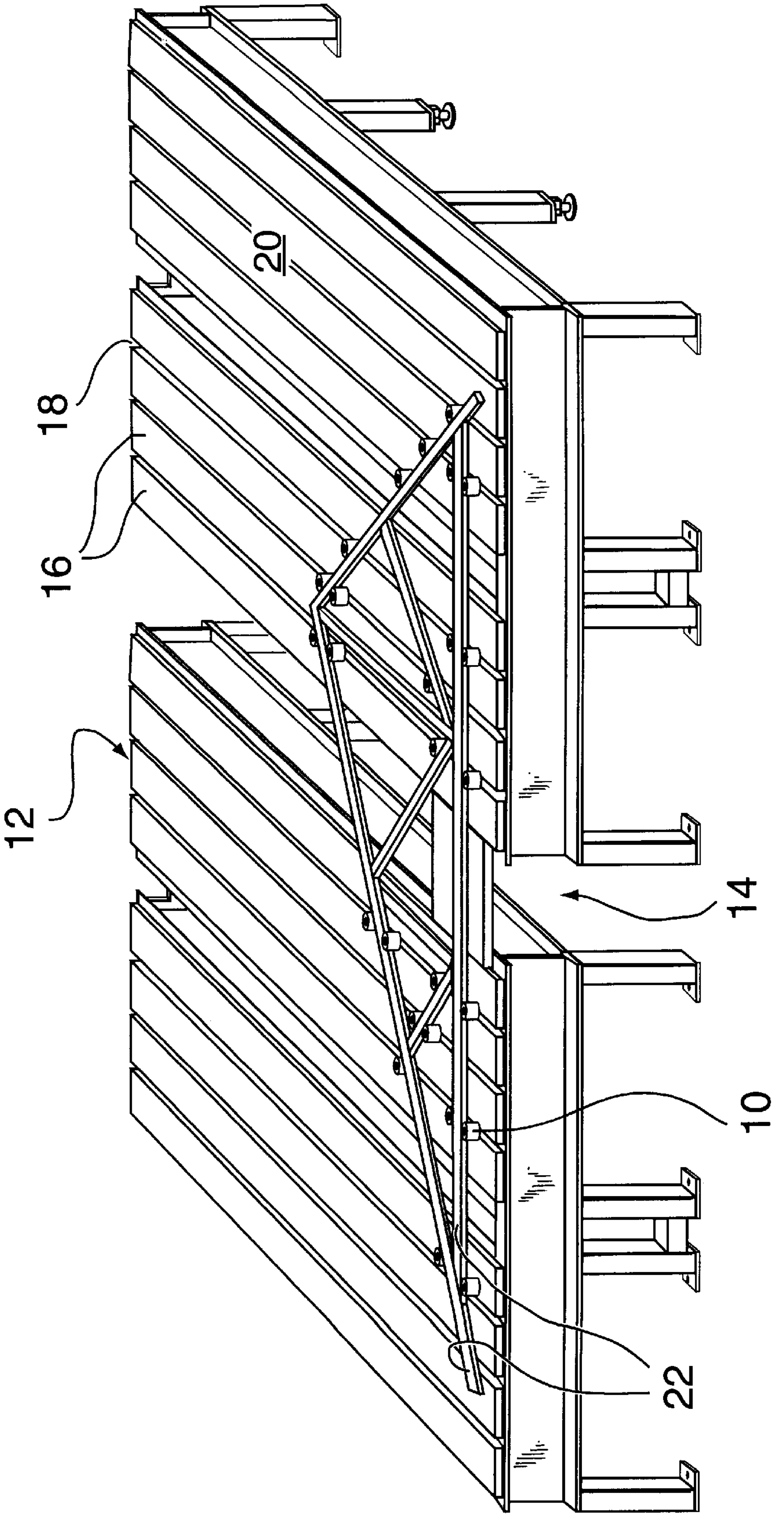
FIG. 1 is a perspective view of a machine table of the type on which the present invention can be used.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, FIG. 1 illustrates a locating device 10 of the type suitable for use on a machine table 12 for building trusses 14 or the like. The machine table 12 is comprised of at least two elongated support members 16, typically in the form of bars or planks, which can be of either metal or wood, or any other suitable material to support the required loads for building and assembling the truss 14. The support members 16 are arranged in parallel so that there are formed slots 18 in between adjacent members 16 in the top surface 20 of the table 14. The locating device 10, or a number of locating devices 10 can then be placed in position within a slot 18 so as to abut against a truss member 22 to hold it in place on the table 12 relative to the other truss members 22.

The locating device 10 will be described in greater detail with reference to FIGS. 2*a* to 2*c* and 3*a* to 3*c*.

Figure 2A:
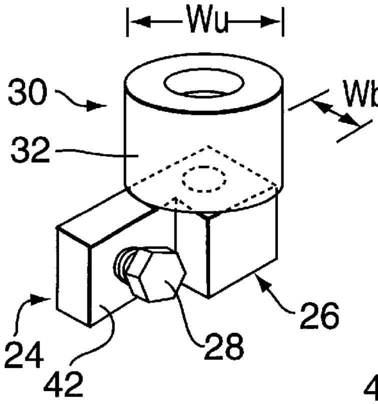
FIGS. 2*a* to 2*c* are perspective views of different embodiments of the locating device of the present invention.
Figure 2B:
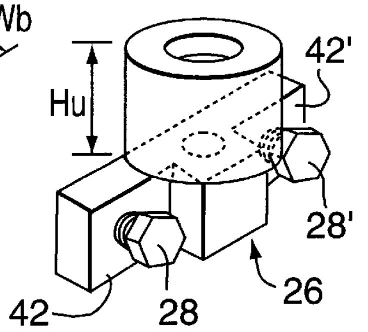
Figure 2C:
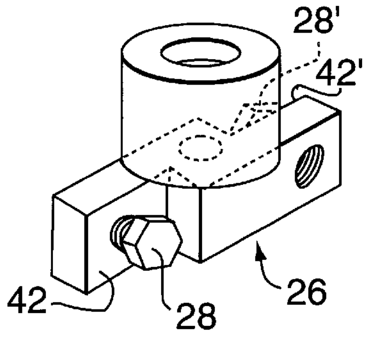

In FIG. 2*a*, a first embodiment of the locating device 10 is illustrated. The locating device 10 comprises a first portion or member 24 made up of a base 26, which has a width $W_b$ which is less than the width $W_s$ of the slot 18 (see FIG. 3*a*), and a locking means 28 which cooperates with the base 26 to releasably secure the base 26 within the slot 18. As seen in FIG. 2*a,* the base 26 comprises one such locking means 28. However, multiple locking means 28 may be employed where the design of the base 26 may accommodate them, such as illustrated in FIGS. 2*b* and 2*c* in which the locating device 10 comprises two locking means 28 and 28'. This provides a greater holding force of the base 26 within the slot 18. The locating device 10 further comprises a second portion or member 30 which is fastened to the first member 24. The second member 30, illustrated in the drawings as a bobbin 32, may be threadably fastened to the base 26 so that it is removable relative to the base 26 (so as to be replaceable when damaged, for example) or it may be permanently affixed to the first member 24, for example by being welded or otherwise adhered to the base 26. In the preferred embodiment, the center line distance between the locking means 28 and the bobbin 32 is such so that the locking means 28 can be accessed with a wrench (or other suitable tool), while the base 26 is in position within the slot 18, i.e. such that the second member 30 does not impede access to the locking means 28 when the base 26 is in position within the slot 18.

Figure 3A:
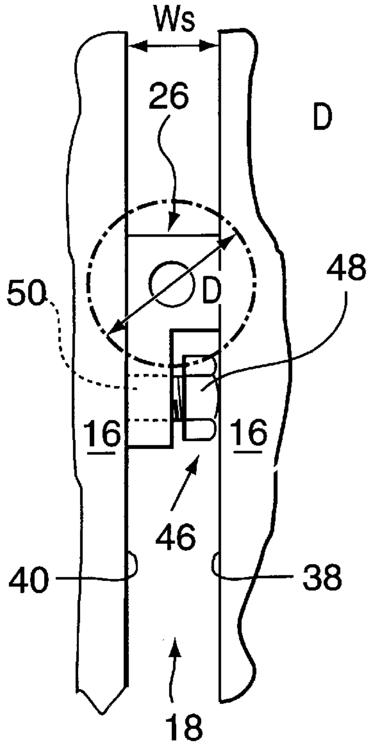
FIGS. 3*a* to 3*c* are top plan views of the locating devices of FIGS. 2*a* to 2*c* in situ within the machine table of FIG. 1.
Figure 3B:
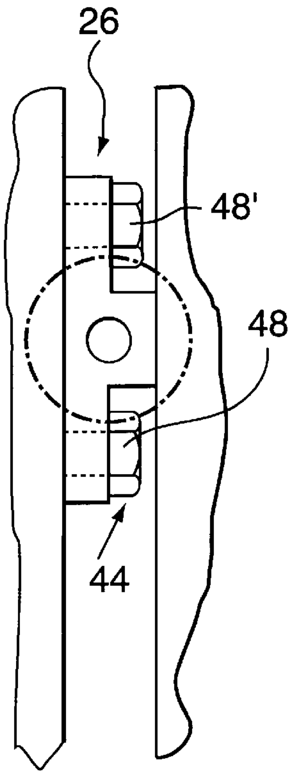
Figure 3C:
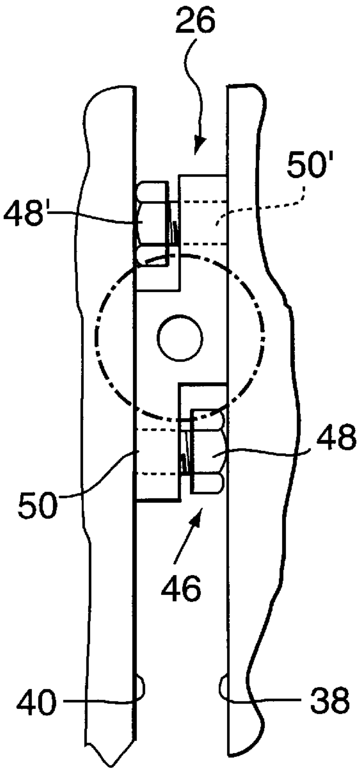
Figure 4:
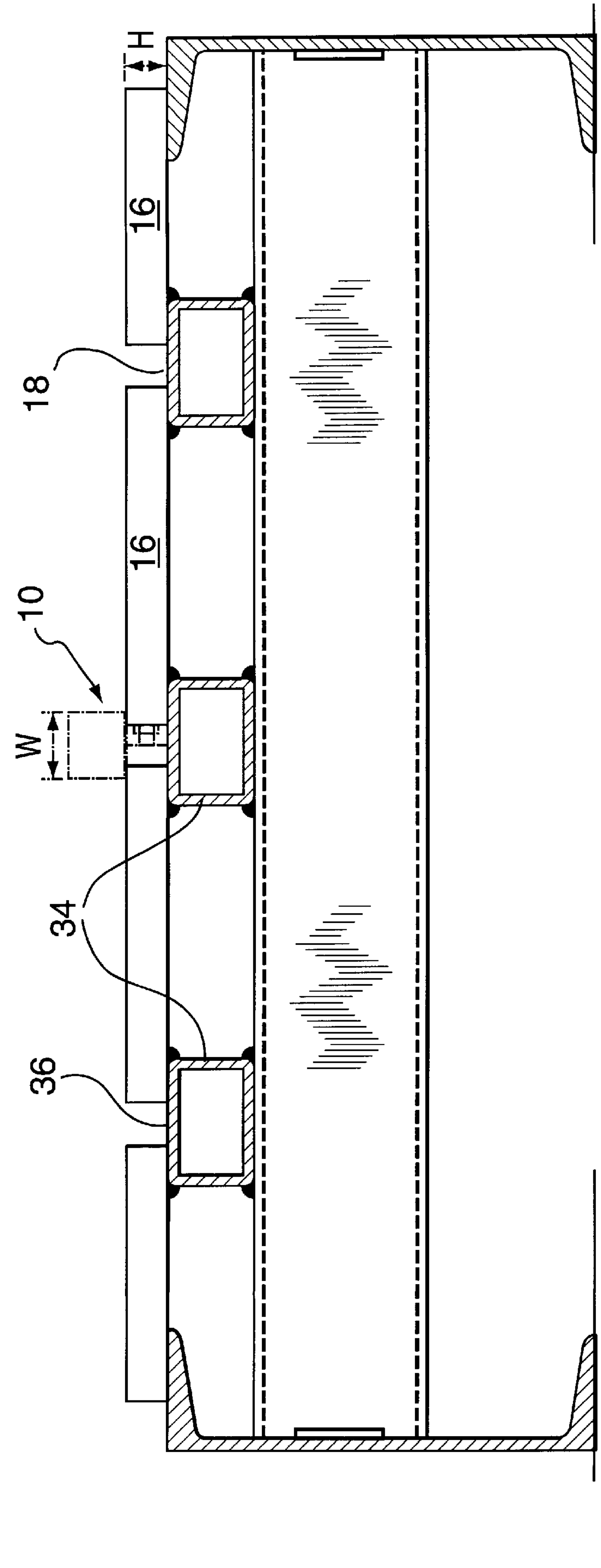
FIG. 4 is an end view of the machine table of FIG. 1.

The second member 30 is designed so as to be upstanding relative to the top surface 20 of the table 12 when the device 10 is in position in the slot 18. This can be achieved in several different ways. First, it is possible to make the width $W_u$ of the second member 30, or the diameter D of the bobbin 32, greater than the width $W_s$ of the slot 18, such that the second member 30 or bobbin 32 rests on the top surface 20 of the table 12 proximate to the slot 18. This is illustrated in FIGS. 3*a* to 3*c*. Alternatively, there may be provided supports 34 under the support members 16 forming a bottom surface 36 in the slot 18 (as illustrated in FIG. 4). In this configuration, the width $W_u$ or the diameter D may be less than the width $W_s$, so long as the height $H_u$ of the second member 30 is greater than the height $H_s$ of the slot 18. However, at all times, the total height of the device 10 must be such that it does not exceed the height $H_s$ plus the thickness of the truss members 22 when the latter are in position on the table 12 and the locating device 10 is in position within the slot 18.

As best seen in FIGS. 3*a* to 3*c* and FIG. 4, the slot 18 has vertical sides 38, 40 extending from the top surface 20 of the table 12 to either the supports 34 or a planar surface of the table 12. In the former case, the sides 38, 40 extend to the bottom surface 36 of the slot 18 to form a channel, such that the base 26 can rest on the bottom surface 36.

With reference to FIGS. 2*a* to 2*c* and 3*a* to 3*c,* it can be seen that the base 26 may be in at least three different forms. As illustrated, when viewed in plan, the base may be any of L-shaped (FIGS. 2*a* and 3*a*), T-shaped (FIGS. 2*b* and 3*b*) or have a stepped configuration (FIGS. 2*c* and 3*c*). In any configuration, the base is provided with at least one laterally directed step formed across the base 26 from top to bottom thereof to define a recessed lateral surface 42 which is spaced from one side 38 of the slot 18 when the base 26 is in position within the slot 18. When the stepped configuration of the base 26 is used, as depicted in FIGS. 2*c* and 3*c,* there are two such recessed surfaces 42, 42'. In the T-shaped configuration (FIGS. 2*b* and 3*b*) each of recessed surfaces 42 and 42' are spaced from the same side of the slot 18. In contrast, in the stepped configuration (FIGS. 2*c* to 3*c*) the recessed surfaces 42 and 42' are spaced from opposite sides of the slot 18.

Where the L-shaped configuration is employed, the base 26 may be extended longitudinally in size to perform a second function. That is, the base may also serve as a filler block beneath the truss, typically at the truss joints where the connector plates are employed. In standard practice, a separate filler block (not shown) is employed within the slot to ensure a homogeneous joint where truss members meet. By extending the base 26, the locating device 10 of the present invention can fill the slot at the desired point, thereby obviating the need for a separate filler block.

The locking means 28 may be in the form of a bolt or threaded fastener as illustrated in FIGS. 2*a* to 2*c* and FIGS. 3*a* to 3*c*. The fastener 28 extends laterally from the recessed surfaces 42 and 42' of the base 26 to hold the device 10 in place relative to the slot 18. The fastener 28 is moveable between a first position 44 (as seen in FIG. 3*b*) in which the base 26 is freely moveable relative to the slot 18 and a second position 46 (as seen in FIGS. 3*a* and 3*c*) in which the base 26 is frictionally engaged against movement relative to the slot 18. In the second position 46 (or the locked position) as illustrated in FIG. 3*a,* the fastener 28 extends laterally from the recessed surface 42 such that the head 48 of the fastener 28 abuts one side 38 of the slot 18 while forcing a surface 50 of the base 26 that is opposite the recessed surface 42 against the opposing side wall 40 of the slot 18. In that position, with the fastener 28 fully tightened, the base 26 is locked, by frictional engagement with the sides 38, 40 of the slot 18, against movement relative to the slot 18. Thus, force exerted against the bobbin 32 which is fastened to the base 26 will not cause the base 26, or the device 10 as a whole, to move in any direction relative to the slot 18. Similarly, the base 26 cannot be removed from the slot 18 until the fastener 28 is loosened relative to the side 38 of the slot 18. As seen in FIGS. 3*a* to 3*c,* the fastener 28 is accessible from a position above the slot 18 when the base 26 is in position within the slot 18.

In the embodiments of FIGS. 2*b* and 2*c* in which the base 26 comprises two recessed surfaces 42, 42' and consequently two locking means 28, 28', the heads 48, 48' of the locking means 28, 28' may each abut the same side 38 of the slot 18 (as illustrated in the embodiment shown in FIGS. 2*b* and 3*b*) or the locking means 28, 28' may each abut opposing sides 38 and 40 of the slot 18 (as illustrated in the embodiment shown in FIGS. 2*c* and 3*c*). In either case, the surface 50, 50' of the base 26 will be forced against the side 38 or 40 of the slot 18 opposite the side being abutted by the head 48, 48' to frictionally engage the base 26 relative to the slot 18.

In use, therefore, the device 10 may be placed in situ in the table 12 by placing the base 26 in position within the slot 18 from above the slot 18. The base 26 is freely moveable within the slot 18, or removable from the slot 18, so long as the locking means 28 is in the first position 44 (as depicted in FIG. 3*b*). Once the base 26 is in the desired position within the slot 18, the fastener 28 may be adjusted to the second or locked position 46 to frictionally engage the base 26 against movement relative to the slot 18. In the embodiment of the invention as illustrated, the bobbin 32 may then be fastened to the base 26 so that the bobbin 32 is upstanding from the slot 18 in order to abut a truss member 22 which is resting on one or more of the support members 16 in order to hold that truss member 22 in place relative to the table top 20.

To relocate or remove the locating device 10, the bobbin 32 does not need to be removed. The fastener 28 can be adjusted from the locked position 46 to the first position 44 and the base 26 can be moved longitudinally within the slot 18 or removed from the slot 18 altogether by lifting it out of the slot 18.

While the invention has been described in conjunction with a single slot 18 formed between two adjacent support members 16, it will be understood that, as illustrated in FIG. 1, the machine table 12 for which the locating device 10 is intended to be used may comprise a plurality of support members 16 and consequently a plurality of slots 18 in the top surface 20 of the table 12. In that situation, a plurality of locating devices 10 may be employed.

Thus, it is apparent that there has been provided in accordance with the invention a workpiece locating device for use on a machine table having at least one elongated slot that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A workpiece locating device for use on a machine table comprising at least two spaced elongated support members arranged in parallel so as to create at least one elongated slot in a top surface of said table between adjacent support members; said locating device comprising;

a first member for insertion into said slot, comprising a base having a width less than the width of said slot and at least one recessed lateral surface spaced from one side of said slot when said base is in position in said slot;

at least one locking means mounted on a vertical side wall of said recessed lateral surface of said base to releaseably secure said base within said slot; and a second member fastened to a top surface of said first member, said second member upstanding relative to said top surface of said table when said device is positioned in said slot.

2. The locating device of claim 1 further comprising a bottom surface in said slot.

3. The locating device of claim 1 wherein said slot has vertical sides.

4. The locating device of claim 1 wherein said second member is fastened to said base.

5. The locating device of claim 1 wherein said locating means comprises a means to frictionally engage said base within said slot.

6. The locating device of claim 5 wherein said locking means is accessible from above said slot when said base is in position in said slot.

7. The locating device of claim 1 wherein in plan said base is L-shaped.

8. The locating device of claim 1 wherein in plan said base is T-shaped.

9. The locating device of claim 1 wherein in plan said base has a stepped configuration.

10. The locating device of claim 1 wherein said base is longitudinally extended to fill a portion of said slot below adjacent truss members.

11. A workpiece locating device comprising a base having a width for fitting completely within a slot of a table;

at least one threaded locking means mounted on a vertical side wall of said base and being moveable between a first position to allow said base to be freely moveable in the slot and a second position for releasably locating said base within the slot of the table; and a bobbin mounted on a top surface of said base in upstanding relation for abutting a workpiece on the table, said bobbin having a diameter greater than said width of said base.

12. In combination a table having a plurality of parallel slots therein; and a plurality of locating devices, each locating device being mounted in a respective one of said slots and including a base having a width less than the width of said respective slot and a longitudinally recessed lateral surface, at least one locking means threaded into and projecting from said longitudinally recessed surface of said base within said respective slot for releasably locking said base within said respective slot and a member mounted on said base and projecting upwardly from said respective slot for abutting a workpiece on said table.

13. The combination as set forth in claim 12 wherein said second member is a bobbin having a diameter greater than said width of said base.

14. A workpiece locating device comprising a base having a width for fitting completely within a slot of a table, said base having at least one laterally directed step formed across said base from top to bottom thereof to define a longitudinally recessed lateral surface;

at least one locking means mounted on said base for releasably locking said base within the slot of the table, said locking means extending laterally from said longitudinally recessed surface of said base; and a member mounted on said base in upstanding relation for abutting a workpiece on the table.

15. A workpiece locating device as set forth in claim 14 wherein said locking means is a bolt movable between a first position to allow said base to slide within the slot and a second position to frictionally engage a side wall of the slot to secure said base within the slot.

16. In combination, a table having a plurality of parallel slots therein; and a plurality of locating devices, each locating device being mounted in a respective one of said slots and including a base having a width less than the width of said respective slot, said base having at least one laterally directed step formed across said base from top to bottom thereof to define a longitudinally recess lateral surface, and at least one locking means extending laterally from said longitudinally recessed surface for releasably locking said base within said respective slot and a member mounted on said base for abutting a workpiece on said table.

17. The combination as set forth in claim 16 wherein said locking means is a bolt movable between a first position to allow said base to slide within the slot and a second position to frictionally engage a side wall of the slot to secure said base in place.

18. A workpiece locating device for use on a machine table comprising at least two spaced elongated support members arranged in parallel so as to create at least one elongated slot in a top surface of said table between adjacent support members; said locating device comprising;

a first member for insertion into said slot, said member comprising a base having a width less than the width of said slot;

at least one locking means mounted on a vertical side wall of said base to releaseably secure said base within said slot; and a second member fastened to a top surface of said first member, said second member upstanding relative to said top surface of said table when said device is positioned in said slot and having a width greater than the width of said slot.

19. The locating device of claim 18 wherein said second member comprises a bobbin having an outside diameter which is greater than the width of said slot.

20. A workpiece locating device for use on a machine table comprising at least two spaced elongated support members arranged in parallel so as to create at least one elongated slot in a top surface of said table between adjacent support members; said locating device comprising a first member for insertion into said slot, said member comprising a base having a width less than the width of said slot;

at least one locking means to releasably secure said base within said slot, said locking means being an adjustable threaded fastener extending from a recessed surface of said base and moveable between a first position in which said base is freely moveable relative to said slot and a second position in which said base is frictionally engaged against movement relative to said slot to releaseably secure said first member within said slot; and a second member fastened to said first member, said second member upstanding relative to said top surface of said table which said device is positioned in said slot.

21. The locating device of claim 20 wherein said threaded fastener is a bolt.

22. A workpiece locating device for use on a machine table comprising a plurality of spaced elongated support members arranged in parallel so as to create a plurality of elongated slots with vertical sides, in a top surface of said table, between adjacent support members; said locating device comprising:

a first member for insertion into said slot, comprising a base having a width less than the width of said slot, at least one recessed lateral surface spaced from one side of said slot when said base is in position in said slot; at least one locking means, accessible from above said slot when said base is in position in said slot, to releasably secure said base within said slot, said locking means comprising an adjustable threaded fastener extending from said recessed surface of said base and moveable between a first position in which said base is freely moveable relative to said slot and a second position in which said base is frictionally engaged against movement relative to said slot; and a second member fastened to said base, said second member having a width greater than the width of said slot and upstanding relative to said top surface of said table when said device is positioned in said slot.

* * * * *